Sept. 9, 1952 E. M. DELORAINE ET AL 2,610,254

MIXED MODULATION IN PULSE INTERCOMMUNICATION SYSTEMS

Filed Dec. 4, 1948 7 Sheets-Sheet 1

Inventors
EDMOND M. DELORAINE
ALEC HARLEY REEVES
By
Robert Harding Jr.
Attorney

MIXED MODULATION IN PULSE INTERCOMMUNICATION SYSTEMS

Filed Dec. 4, 1948 7 Sheets-Sheet 2

Inventors
EDMOND M. DELORAINE
ALEC HARLEY REEVES
By
Robert Harding Jr.
Attorney

Sept. 9, 1952 E. M. DELORAINE ET AL 2,610,254

MIXED MODULATION IN PULSE INTERCOMMUNICATION SYSTEMS

Filed Dec. 4, 1948 7 Sheets-Sheet 3

Inventors
EDMOND M. DELORAINE
ALEC HARLEY REEVES
By Robert Harding Jr.
Attorney

MIXED MODULATION IN PULSE INTERCOMMUNICATION SYSTEMS

Filed Dec. 4, 1948 7 Sheets-Sheet 4

Inventors
EDMOND M. DELORAINE
ALEC HARLEY REEVES
By Robert Harding Jr.
Attorney

Inventors
EDMOND M. DELORAINE
ALEC HARLEY REEVES
By Robert Harding Jr
Attorney

MIXED MODULATION IN PULSE INTERCOMMUNICATION SYSTEMS

Filed Dec. 4, 1948 7 Sheets-Sheet 6

Inventors
EDMOND M. DELORAINE
ALEC HARLEY REEVES
By
Robert Harding Jr.
Attorney

Sept. 9, 1952 E. M. DELORAINE ET AL 2,610,254

MIXED MODULATION IN PULSE INTERCOMMUNICATION SYSTEMS

Filed Dec. 4, 1948 7 Sheets-Sheet 7

Inventors
EDMOND M. DELORAINE
ALEC HARLEY REEVES
By Robert Harding Jr.
Attorney

Patented Sept. 9, 1952

2,610,254

UNITED STATES PATENT OFFICE 2,610,254

MIXED MODULATION IN PULSE INTER-COMMUNICATION SYSTEMS

Edmond Maurice Deloraine and Alec Harley Reeves, London, England, assignors to International Standard Electric Corporation, New York, N. Y., a corporation of Delaware Application December 4, 1948, Serial No. 63,592
In Great Britain December 7, 1947

16 Claims. (Cl. 179—15)

This invention relates to telephone exchange systems wherein intelligence is transmitted in the form of electric pulses modulated by the intelligence, and concerns the transmission problems encountered in such systems.

Systems of this type have been proposed whereby a number of different channels are provided in the form of different time positions in a recurring cycle of time positions which is sometimes referred to as "time division multiplex."

In a system catering for a large number of substations the number of time positions required, in central parts of the system, to accommodate the necessary number of channels may well be large and involve the use of closely spaced pulses.

The term "telephone exchange system" used in this specification means either a single main exchange and its subscriber network or a network of relatively closely-spaced exchanges between which direct current dialling and supervision have normally been used, e. g. the network of exchanges in a built-up area.

According to one of its features, the invention consists of a telephone exchange system wherein communication channels take the form of time positions in a recurring cycle of time positions, characterized in this that two or more such recurring cycles of time positions form individual links in the said system and that two or more time cycles, forming links in the system are concentrated together by re-timing and combination of the individual time cycles thereof in a single cycle of time positions forming a link in the system the time positions of such single time cycle being of shorter duration and higher repetition frequency than is the case with the said two or more time cycles so concentrated.

According to another of its features the invention consists of a telephone exchange system wherein communication channels take the form of time positions in a recurring cycle of time positions, wherein intelligence is conveyed on such channels by electric pulses one or more characteristics of which is or are modulated in conformity with the said intelligence characterised in this that two or more such recurring cycles of time positions form individual links in the system and that the way of modulation of the said pulses and the intelligence-modulation relation are different as between different links of the said system and that conversion from one way of modulation to another and from one intelligence-modulation relation to another is effected as between different links of the system whereby that way of modulation and intelligence-modulation relation is used in each link of the system which is best adapted to the transmission conditions in that link.

According to another of its features the invention consists of a telephone exchange system wherein communication channels take the form of time positions in a recurring cycle of time positions, wherein intelligence is conveyed on such channels by electric pulses one or more characteristics of which is or are modulated in conformity with the said intelligence characterised in this that two or more such recurring cycles of time positions form individual links in the system one or some of such links being more prone to cross-talk than the others and that the way of modulation and the intelligence modulation relation are different as between different links of the system and that in a link or links most prone to cross-talk, a way of modulation and intelligence-modulation relation is used which gives a better performance with respect to the avoidance of cross-talk than that of other ways of modulation and intelligence-modulation relations used in other parts of the system.

According to another of its features the invention consists of a telephone exchange system wherein communication channels take the form of time positions in a recurring cycle of time positions, wherein intelligence is conveyed on such channels by electric pulses one or more characteristics of which is or are modulated in conformity with the said intelligence characterised in this that two or more such recurring cycles of time positions form individual links in the system and that the way of modulation of the said pulses and the intelligence modulation relation are different as between different links of the system, at least one of such different ways of modulation and intelligence relation being of the type hereinafter described as pulse code modulation A, the use of which is confined to links of the system which accommodate a larger number of time positions in a given time period than do other links of the system.

According to another of its features the invention consists of a telephone exchange system wherein communication channels take the form of time positions in a recurring cycle of time position, wherein intelligence is conveyed on such channels by electric pulses one or more characteristics of which is or are modulated in conformity with the said intelligence characterised in this that two or more such recurring cycles of time positions form individual links in the system and that the way of modulation of the said pulses and the intelligence-modulation relation are different as between different links of the system, at least one of such different ways of modulation and intelligence-modulation relation being of the type hereinafter described as pulse code modulation B, the use of which is confined to links of the system which accommodate a larger number of time positions in a given time period than do other links of the system.

The expressions "way of modulation" and "intelligence-modulation relation" used in the five preceding paragraphs have the meanings hereinafter assigned to them in this specification.

The invention will now be described with reference to the accompanying drawings in which.

Figure 1:
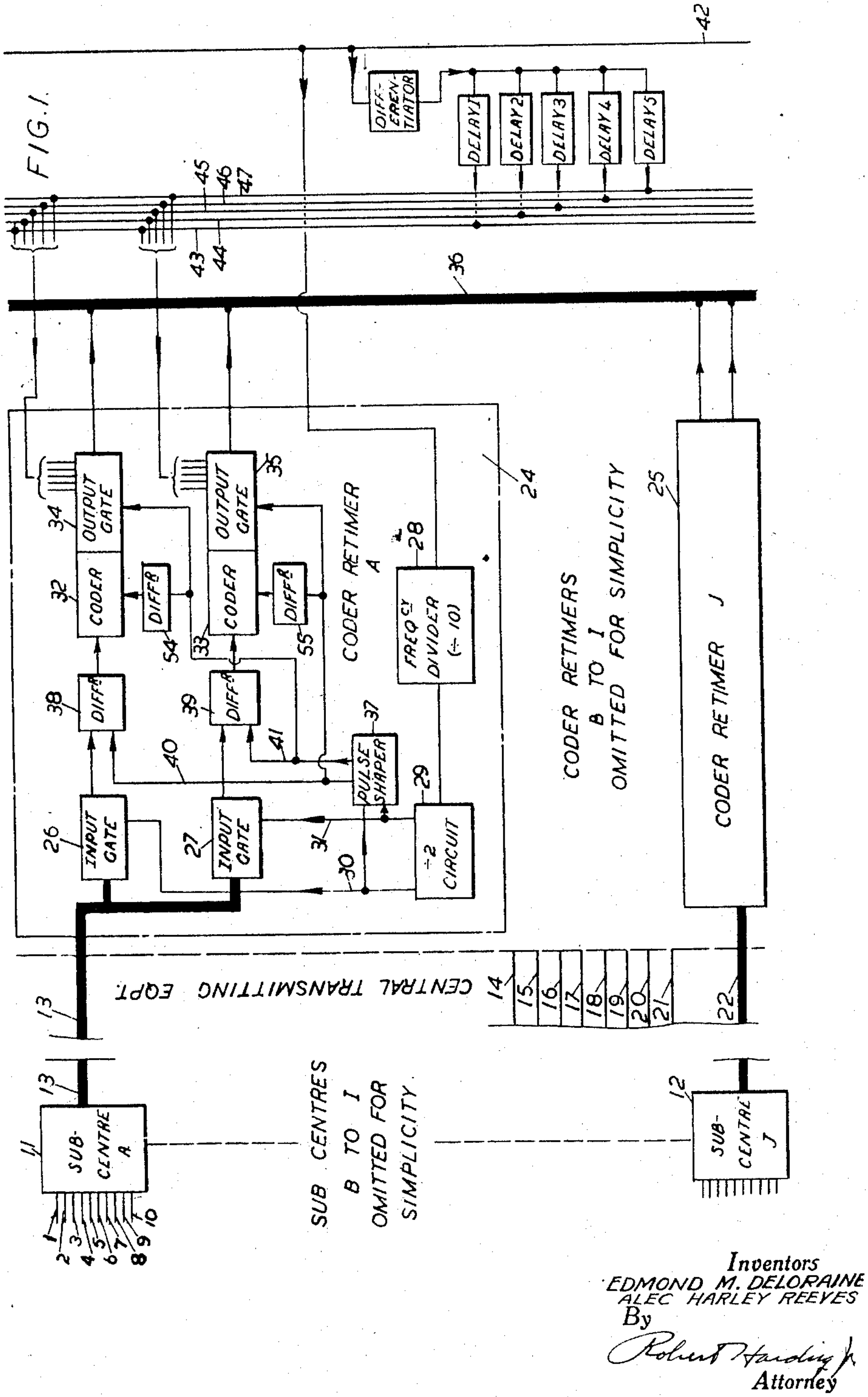
Fig. 1 is a schematic diagram of the transmitting portions of an embodiment according to the invention.

A system such as that described of which some parts comprise individual groups of time division multiplex channels having a relatively small number of channels to accommodate and in which these time division multiplex groups are concentrated into a smaller number of time division multiplex super groups in central parts of the system, involves the transmission in a common super-group transmission path of a larger number of channels than need be accommodated in one of the constituent groups and consequently the individual pulses must be of short duration and more closely spaced.

As pulses on a time division multiplex carry intelligence in the form of modulation of one or more characteristics of the pulses, and as a uniform standard of transmission fidelity is required throughout the system it would appear to be desirable to choose the form of modulation giving the required fidelity and to use it uniformly throughout the system wherever the intelligence is transmitted in pulse form.

In a system of the type described however the transmission problems are not uniform throughout the system and it is proposed to take the unusual step of using different types of modulation in different parts of the system choosing for each link in the system the type of modulation best suited to the transmission characteristics of that link. It is found that the extra complication is amply justified by the resulting improvements in transmission performance.

The different transmission conditions arise largely from the different time division multiplex cycles used in the system. Some forms of modulation are preferable in some types of multiplex and other forms of modulation in other parts of the system, it is proposed to use different forms of modulation in different parts of a system of the type described so as to have in each part of the system the most advantageous form of modulation for the type of time division multiplex used in that part of the system. The advantage may of course be functional or economic or a combination of the two.

The well known pulse amplitude modulation, pulse width modulation and pulse time (or position) modulation are simple and economical in apparatus but in general require a higher frequency band-width capacity in the transmission path than certain of the types of modulation which are referred to below.

A type of modulation has been proposed in U. S. Patent No. 2,272,070, issued February 3, 1942, where a number of fixed levels of signal amplitude are determined, the instantaneous value of a signal being defined as that one of these levels to which it is nearest at the instant in question. Each level may be related to a definite signal, characteristic of it, such as the five unit code signal commonly used to transmit a teleprinter character, and the fixed level nearest to the instantaneous amplitude of the signal may then be transmitted by a pulse or a train of pulses of a type corresponding to that fixed level according to the chosen code.

These code signals are practically immune from interference by other signals on other channel pulses and it has been found that speech may be defined with allowably small distortion by defining its instantaneous amplitudes in terms of 32 fixed levels which can be reproduced by a five-unit code such as the teleprinter code.

It is possible of course to provide that the nearest fixed level above, or the nearest fixed level below, the instantaneous level of the intelligence waveform shall be used rather than the nearest level.

This type of modulation is hereinafter referred to as "pulse code modulation A."

Somewhat similar types of modulation have been proposed in co-pending applications, Ser. No. 778,662 and Serial No. 778,663, filed October 8, 1947. The waveform of an intelligence signal is defined by a positive pulse, a negative pulse or no pulse at all, the pulses occurring at fixed times and having fixed amplitudes. The intelligence waveform is observed at regularly spaced intervals coinciding with the pulse times and a positive pulse records a change in amplitude in the positive going direction between that pulse time and the preceding pulse time, in excess of a predetermined amount, the absence of a pulse records during a similar period no change in amplitude or a change less than the predetermined amount and a negative pulse, records a change in amplitude in the negative going direction, during a similar period, in excess of a predetermined amount.

The original intelligence waveform is reproduced by integrating devices which add the effects of successive pulses and the waveform is reproduced more or less accurately according to the closeness of the spacing of the coding pulses and the level of minimum change below which the pulse is absent.

The co-pending applications, Ser. No. 778,662 and Ser. No. 778,663 also described a variant of this system in which only two alternative indications are given which may be represented by a positive pulse and a negative pulse respectively.

Once started, on the transmission of a pulse of one polarity, pulses of that polarity will continue to be transmitted until their polarity is reversed in the following manner. The pulse output is integrated to provide a stepped waveform which is similar to that at the receiving end. This is a rough representation of the signal wave form. A comparator compares this stepped waveform with that of the incoming intelligence and when successive pulses in one direction have built up a voltage at the output of the integration which is greater than the intelligence waveform voltage, the polarity of the outgoing pulses is reversed. The process proceeds in the other direction until the integrated waveform again overtakes the intelligence waveform causing another reversal of pulse polarity.

The comparison, which governs the polarity of the pulse output, is between the intelligence waveform and the integrated amplitude of all preceding output pulses, at the time of the transmission of a given pulse. When one is the bigger a pulse of one polarity is transmitted and when the other is the bigger, the pulse of the opposite polarity is transmitted.

At the receiving end the pulses are integrated and low pass filtered to recover the intelligence waveform.

These types of modulation are hereinafter collectively referred to as "pulse communication code B."

An embodiment of the invention will now be described which illustrates a telephone exchange system viewed from the standpoint of the transmission problems only, the selective features which are not material to the invention being omitted for simplicity. Pulse time modulation is used in one part of a transmission system and pulse code modulation A in another part.

A number of physical channels serving individual subscribers are arranged in groups, each group being taken to a sub-centre.

Fig. 1 shows ten such physical channels 1 to 10, terminating in a sub-centre 11. Altogether ten such groups of channels and sub-centres are catered for in this embodiment, only the first and the last being shown in the figure, the tenth sub-centre being indicated by reference numeral 12.

Each sub-centre comprises a distributor device adapted to receive the physical channels and distribute them in time in a recurring cycle of time positions.

The distributor applies the time-distributed channels to a single transmission path 13 in the form of pulses at the different time positions in the said cycle and is further adapted to convert intelligence carried by the channels into time modulation of the pulses respectively representing the channels, in the said cycle.

A device suitable as a distributor for a sub-centre is described in co-pending application, Ser. No. 777,818.

Reverting to Fig. 1 of the accompanying drawings a number of incoming transmission paths such as 13, 14, 15 and 16, 17, 18, 19, 20, 21, and 22 are brought to central transmitting equipment 23 and there terminated on individual coder-retimer circuits such as 24. The figure shows a system having 10 such incoming transmission paths and coder-retimers, the first, 24, being shown in complete schematic form and the tenth in skeleton, the intermediate coder-retimers being indicated by a note.

The functions of the coder retimers are to take the time modulated time position multiplex pulses from the ten transmission paths 13 to 22 inclusive, to convert the linear time modulation to a modulation in the fixed amplitude levels or steps of pulse modulation A, and to convert this step modulation into a five unit code each unit of the code having two possible conditions represented by a pulse or absence of a pulse respectively. This can provide 32 combinations representing 32 fixed amplitude levels.

At the same time the five coded output pulses from each coder-retimer are concentrated in duration so that the whole five-pulse period takes approximately one tenth of the time allotted to the original channel it represents, and the intervening nine tenths is taken up with similar five-unit code pulses from a corresponding channel of each of the nine other channel groups.

It has been stated above that the time position cycles of the various groups are coincident. So far as frequency is concerned, this is so, but from the point of view of phase, the position is more complex.

The frequency of the time cycles of ten distributors in the various transmitting sub-centres must be synchronised and this may be done by the transmission from the central equipment of a synchronising frequency or alternatively, since in a two way system there will be a receiving sub-centre associated with each transmitting sub-centre which will receive on a distributor time modulated pulses from central receiving equipment associated with the central transmitting equipment, on a time position cycle of the same frequency as that of the transmitting subcentres and a synchronising signal can be obtained from the received time modulated cycle and used to synchronise the distributor at the associated transmitting subcentre.

Whatever the relative phases of the time position cycles at the sub-centres, they will not remain the same after transmission over the different transmission paths 13 to 22 which may be of different lengths and have different delay times.

This cannot be tolerated at the central transmitting equipment and compensating delay circuits must be inserted in the individual transmission paths to adjust their relative phases after they have been upset by the different transmission paths.

For reasons explained below, this phase adjustment is arranged so that the time positions of the different groups are staggered by a small amount, that is to say substantially by the time taken to transmit a five unit code from a coder retimer in the central transmitting equipment.

This is about one tenth of the time allotted to each time position in a group so that there will be a substantial overlap between channels on the groups. For instance the time position of channel 1 of group B will start a tenth of a time position duration later than the time position of channel 1 of group A.

The relative phasing of the various distributors at the transmitting subcentres is thus unimportant provided that it remains constant. This can be ensured by frequency synchronisation without regard to phase, which is fortunate because a phase synchronising signal emanating from the central equipment would be likely to undergo different delays in transmission to the different sub-centres and to avoid this, each group would need a phase correcting delay device to compensate for the delay in the transmission path from the central equipment.

The general principle of operation of the coder retimers is as follows:

Each of them has two identical parts which function alternately: One part scans the pulse of one channel on its occurrence and codes, retimes and transmits during the time position allotted to the next channel. The other part does the same but is displaced by one channel period so that one part encodes the even channels and the other part the odd channels.

Each part of a coder-retimer has an input gate (26, 27). These gates open alternately and stay open for substantially the time position duration of the channel to be scanned.

The timing is arranged as follows:

The central transmitting equipment has a common busbar 42 carrying pulses at a repetition frequency ten times that of the pulse recurrence frequency in a group transmission path. (Ten times when ten groups are catered for. With fewer groups fewer times.) Each coder-retimer incorporates a frequency divider (28) dividing this frequency by a factor equal to the number of groups and producing a pulse at a definite phase. This phase differs between one coder retimer and the next by one tenth of the channel time position duration, so that output pulses of the frequency dividers of all the coder retimers are evenly spaced within the time position duration of a group channel.

The output pulse from the frequency divider 28 is passed to a divide-by-two circuit 29 which diverts alternate pulses from the frequency divider alternately to outlet connections 30 and 31. These pulses are elongated again by the divide-by-two circuit so that they have a duration equal to a group channel time position duration. These elongated pulses are phased so as to coincide with the time positions of the group served by the coder-retimer which have themselves been phase-adjusted in the manner explained above.

The gates of the two parts of a coder-retimer are alternately opened to admit the passage of alternate channel pulses of the group served by the coder-retimer.

A suitable circuit for the frequency divider would be a conventional gaseous discharge tube counting train with an output circuit connected to a particular discharge gap in the train. Starting from rest the counting would commence at the beginning of the train and an output pulse would be drived from the output circuit connection to the chosen discharge gap, when that gap was reached by the count. By connecting different gaps to the output circuit in the frequency dividers of the different coder-retimers, the output pulse could be made to occur at different times for the different coder-retimers, as required. In co-pending application Ser. No. 763,655, filed July 25, 1947, there is described a multi-gap discharge tube adapted to fire its gaps in succession when supplied with recurring pulses, due to ionisation coupling from a discharging gap to an adjacent unfired gap to extinguish its gaps when all have fired and to repeat the process without pause so long as the pulses are applied. One form of this device has its gaps separately connected so that individual circuits can be inserted in series with any gap. Such a device operates as a counting train and the connection of an output circuit in series with a chosen gap would enable it to fulfill the function of frequency divider 28.

The divide-by-two circuit 29 could be a double stability trigger circuit of the Eccles-Jordan type or a multivibrator locked to the frequency divider pulse with two stable states changing from one to the other each time a pulse was applied to it. Such a circuit would give an output to one connection (30) in one stable state and to another connection (31) in its other stable state, and these pulses would have the required duration and phase for opening gate circuits 26 and 27.

Each part of a coder-retimer has a coder (32, 33) fed by an input gate (26, 27 respectively). These coders observe the modulation of the pulses admitted to them by their respective input gates and count its modulation time displacement in relation to a reference time. The count is such that 32 predetermined time periods are together equal to the longest possible time displacement corresponding to the peaks of 100% modulation. The count is to the nearest whole number of such predetermined time periods below the time of modulation displacement of the scanned channel pulse. Each coder feeds an output gate (34, 35) which has five sections. The said count, by a coder, is preferably carried out by a binary counter having five stages each stage having two states which may be considered as the "on" and "off" states respectively. When a count is complete, any given number of the predetermined time periods resulting from the count results in a particular combination of settings of the individual stages of the binary counter. The five sections of the output gate are set by the five stages of the binary counter and when an output gate opening pulse is applied to all, those set by a binary counter stage in the "on" condition are opened, and the others not.

A recurring coding pulse from one of five common busbars is applied continuously to each of the output gate sections so that the pulses fed to the five sections are in a different phase from one another. These pulses are admitted by those gate sections which are opened and blocked by those which are not. A common circuit, to which the outputs of the five output gate sections are applied, thus receives a five unit code representing the amplitude of the scanned channel pulse to the nearest lower amplitude of 32 fixed amplitude levels or steps. This only happens during the output and gate opening pulse. The determination of the levels is thus done by the coder and the five unit coding the output gate.

Both output gates of a coder-retimer alternately feed their output into a common busbar 36, and the timing of the coding pulses applied to the five output gate units, together with that of the gate opening pulse determines the time during which a given channel "appears" on the busbar 36.

The gate opening pulses are provided by the divide-by-two circuit 29, the connection supplying the coder of one part of a coder-retimer, being used to provide the output gate opening pulse for the other part in a manner to be explained later.

Figure 3:
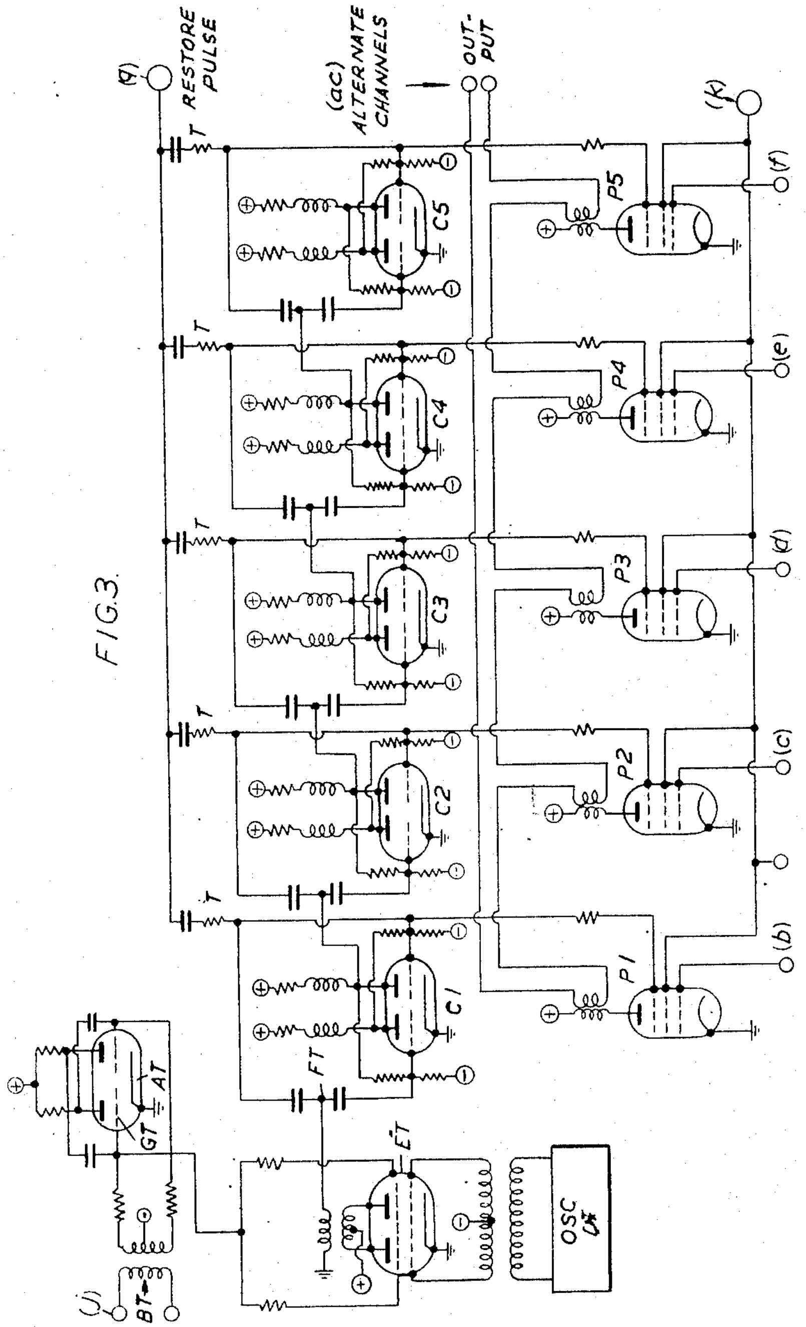
Fig. 3 is a circuit diagram of part of the equipment shown schematically in Fig. 1.

The circuit of Fig. 3 which may be used as a coder, in this embodiment, requires as an input, a reference pulse occurring on or after the opening of the input gate to the coder, and a pulse derived from the modulated channel pulse to be scanned, the time between the two being measured. The reference pulse must precede the derived channel pulse in the earliest modulation timing of the latter.

It is convenient to derive the reference pulse from the divide-by-two circuit input gate pulse. This may be done in a number of ways, the preferred way however is to use the leading edge of the input gate pulse to trigger a pulse shaping circuit 37 of the self-restoring type (a self-restoring flip-flop circuit for instance) with a restoring time somewhat less than the duration of a channel pulse in the transmission paths 13 to 22, and to differentiate the trailing edge of this pulse in a differentiator (38—39). The trailing edge of the scanned channel pulse can then be differentiated in the same differentiator and the two resulting pulses which are preferably of negative polarity can be used as the input to the coder.

It will be seen from Fig. 1 that the pulse shaper 37 is fed in two phases from connections 30 and 31 and should have a separate trigger circuit for each phase giving two outputs, one to connection 40 and the other to connection 41, feeding differentiators 38 and 39 serving the first and second coders respectively. The same pulses are used as the output gate opening pulses but the connections are crossed over.

A pulse is required to restore the coders to normal after the code pulses have been transmitted to bus bar 36. This pulse can be derived from the output gate opening pulse by differentiating its trailing edge in a differentiator (54 for one coder, 55 for the other).

Figure 2:
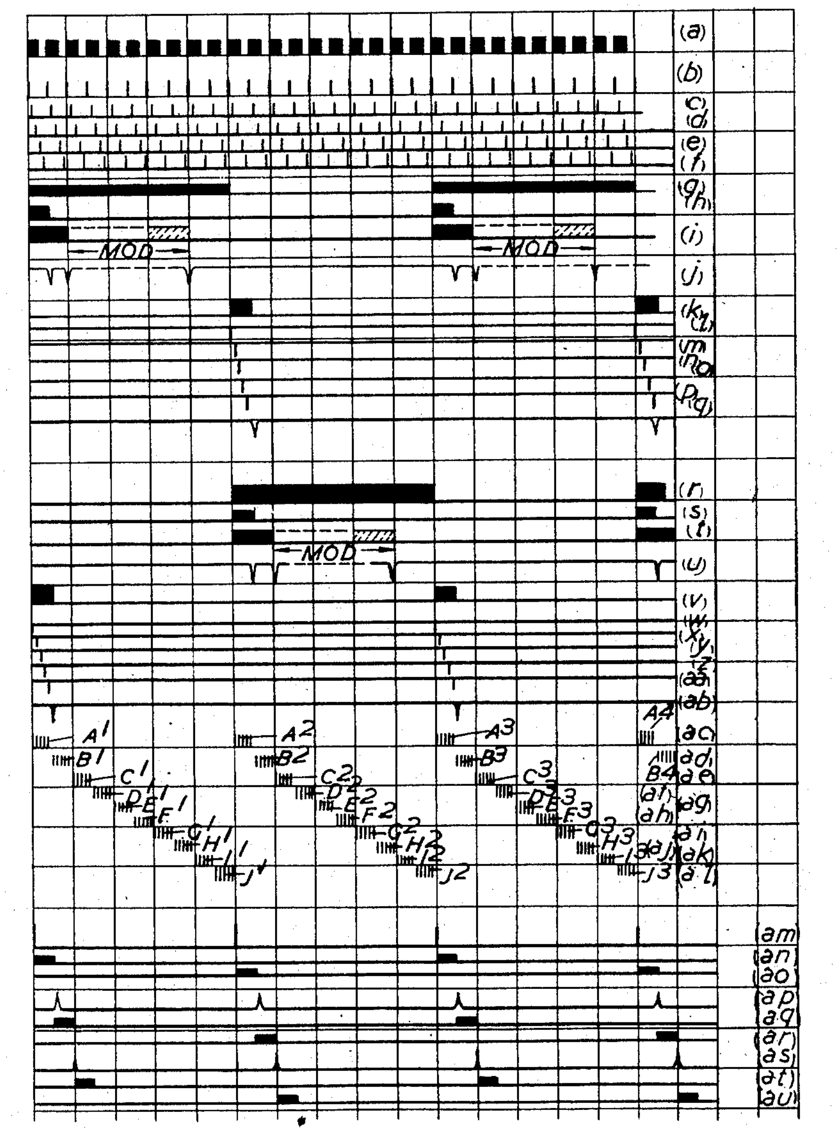
Fig. 2 is a series of graphs showing waveforms occurring at various parts of the equipment shown in Fig. 1.

It is convenient at this point to study the timing of the various operations with the assistance of Fig. 2 and to summarise the various bus bar supplies at the central transmitting equipment.

The basic frequency is that of the time positions of the channel groups at the subcentres. This will be determined by the number of channels per group and the cycle repetition frequency required to produce the intelligence on a channel.

For transmission of speech signals a cycle recurrence frequency of about 8 kc./s. will suffice but 10 kc./s. is preferable, producing about 3 "appearances" of a channel pulse during each cycle of a signal of 3300 cycles frequency, being the highest frequency required for the reproduction of good class "commercial" speech.

The inter-pulse spacing of the channel pulses should be as large as possible in the multiplex paths (13—22) and is a compromise between convenient pulse width, modulation depth and inter-channel spacing, governing the band width required in the transmission path, the maximum transference of energy and the minimum cross talk respectively though these factors also interact with one another.

Where there are ten channels per group, the pulse recurrence frequency will be 100 kc./s. the time available per channel being 10 microseconds, and in interleaving a number of such groups in a common multiplex cycle, this is the time available for the appearances of one channel of each group. The time per channel, for ten groups, thus becomes one microsecond, in the common multiplex cycle.

The frequency dividers (28) of the coder retimers are basically responsible for arranging corresponding channels from each group in their correct sequence in the common multiplex cycle and the frequency dividers are connected to a common busbar 42 carrying pulses of one megacycle repetition frequency (one microsecond pulse cycle period).

When pulse code modulation A is used, a number of code pulses (five in this case, but the number is variable according to the number of fixed amplitude levels decided upon and according also to the number of alternative conditions of each code unit) must be accommodated during the time allotted to each channel, i. e. in one microsecond in this instance.

A comparison of the relative merits of pulse code modulation A, and pulse time modulation can be made at this point.

It has been found that a code represented by five pulses occupying altogether one microsecond can be accommodated on a transmission path having a 2½ megacycle band width since the receiving equipment has only to detect the presence or absence of a pulse at a certain mean timing and the pulses may be of sine wave shape for this purpose and may overlap so as to form in effect a two phase current at 2½ megacycles. The overlap of the pulses occurs at a relatively low amplitude level compared with the peak level and does not appreciably confuse the detection of a pulse.

With a time position cycle frequency of 10 kc./s. required to reproduce speech frequencies, as explained above, the cycle time is 100 microseconds which will accommodate 500 individual code pulses (or their time positions when absent according to the code) and, at five code pulses to a channel, this transmission path will accommodate one hundred channels with a very low level of cross talk. Cross talk can only occur when a code pulse of one channel is interfered with by another channel so as to make a pulse fall below the detection level or to cause the detection of a pulse when there is not supposed to be one. The absence of cross talk is thus absolute up to a certain interference level and above that level the distortion is of the "blot-out" type since a code is completely corrupted and produces a totally different amplitude level to that intended, after demodulation.

In a comparable transmission path (having 2½ megacycles band width), using pulse time modulation, the pulses must be of good square shape to enable their modulation timing to be precisely defined, and it is considered that harmonics up to the fifth, must be present. The fundamental pulse recurrence frequency must therefore be of the order of 500 kc./s. (⅕ of 2½ meg. c./s.), giving 2 microseconds for the pulse cycle time and 1 microsecond for the pulse width.

To avoid objectionable cross talk and give reasonable modulation depth, an overall channel time of about five times the pulse width is generally found to be necessary giving a channel accommodation time of 5 microseconds and a channel pulse recurrence frequency of 200 kc./s. On this basis, the 100 microsecond cycle time (required to reproduce speech as aforesaid), will accommodate only 20 channels as compared with 100 for pulse code modulation A, a ratio of 1 to 5.

Turning now to Fig. 2, which shows a series of graphs with lower case letter references down the right hand margin—

(*a*) shows the pulses carried by bus bar 42.

(*b*), (*c*), (*d*), (*e*) and (*f*) show the pulses carried respectively by five bus bars 43, 44, 45, 46, and 47. Each of these bus bars carries a narrow pulse which need not be of square wave form since it forms a code pulse with a repetition frequency of 1 megacycle and the corresponding pulses in the five busbars are displaced in phase with respect to one another so that they occupy a time of one microsecond. These busbars can be fed from busbar 42 through a differentiator 48 which produces a sharp pulse at the leading edge of each 1 megacycle pulse in busbar 42, which is then applied to each of busbars 43 to 47 through individual delay circuits 49, 50, 51, 52 and 53. Alternatively these five busbars may be supplied from an independent source.

(g) shows the waveform of the input gate opening pulses applied over connection 30 to input gate 26 (the corresponding pulse in connection 31 is shown at (r)).

(h) shows the pulses from pulse shaper 37 applied over connection 40 to differentiator 38.

(i) shows pulse time modulated pulses of alternate channels, from transmission path 13 passed through input gate 26 the other alternate channel pulses are shown at (t)).

(j) shows the output of differenator 38 consisting of a negative peak derived from the trailing edge of the pulse shown at (h) followed by another negative peak derived from the trailing edge of the time modulated channel pulse shown at (i), and this latter peak is varied in its timing according to the modulation of the channel pulse. These peaks form the input to coder 32 and the time between them is counted to the nearest lower whole number out of the 32 predetermined time intervals.

(k) shows the pulse applied by pulse shaper 37 along connection 41 to, differentiator 39 and also to output gate 35 as the output gate opening pulse for that gate.

(l), (m), (n), (o) and (p) show the five pulses applied from the five busbars 43, 44, 45, 46 and 47 to the five sections of output gate 34 respectively. As previously explained, three conditions must be fulfilled for a section of an output gate to transmit a pulse: The corresponding binary counter stage must have been set to the "on" condition by the coder count, the output gate opening pulse from pulse shaper 37 must be present and a pulse from the appropriate one of the busbars 43 to 47 must be present.

The latter pulses are applied all the time but can only be effective during the output gate opening pulse and so (l), (m), (n), (o), and (p) only show the effective pulses from busbars 43 to 47.

(q) shows a pulse derived from the trailing edge of the pulse shaper 37 pulse which is used to clear down the binary counter in the coder after it has done its work of delivery of the code to bus bar 36. This pulse may be taken from connection 41 as shown in the figure, the trailing edge of the output gate opening pulse being differentiated by differentiators 54 and 55 for the two parts of a coder retimer.

(r), (s), (t), (u), (v), (w), (x), (y), (aa) and (ab) show the corresponding waveforms in respect of the other part of coder-retimer 24.

(ac), (ad), (ae), (af), (ag), (ah), (ai), (aj), (ak) and (al) show the timings of the various channel code pulses from channels of the various groups, as applied to the busbar 36. All five pulses are shown as present in each case but in fact of course some pulses will usually be absent according to the particular code combinations set up by the coders.

(am), (an) and (o) show respectively the pulses from frequency divider 28 and from pulse shaper 37 along connections 40 and 41.

(ap), (aq) and (ar) show corresponding wave forms for the coder-retimer of group B.

(as), (at) and (au) show corresponding wave forms for the coder retimer of group C.

Similar wave forms with corresponding phase displacements appear in the coder retimers of the other groups. These last nine graphs serve to emphasize the phase displacement of the multiplex time cycles in the various transmission paths 13 to 22, which are adjusted by the delay compensating circuits which have been previously mentioned but which are omitted from Fig. 1, for the sake of simplicity.

The circuits for frequency divider 28 divide-by-two circuit 29, pulse shaper 37, input gates 26 and 27 and differentiators 38 and 39 may be circuits well known to the art of the types already indicated.

The coders and output gates may be substantially of a type described in U. S. Patent No. 2,272,070, issued February 3, 1942, and shown in Fig. 4 of the drawings accompanying that patent. The circuits as described in that patent may be simplified somewhat and to indicate a suitable form which they may take, Fig. 3 is a reproduction of Fig. 4, of the drawings accompanying the said patent, with the simplifications made. For ease of comparison with that patent the same reference characters have been used in Fig. 3 as were used in Fig. 4 accompanying the said patent.

The following is a description of the operation of the simplified circuits.

The circuits will be described as if they were acting in the role of coder 32 and output gate 34. Terminals on the figure are marked with lower case letter references indicating that waveforms as indicated by the same letter references in Fig. 2, are applied to such terminals.

The valve AT is a double triode connected as an Eccles-Jordan circuit having two stable states, to which are applied at BT pulses from differentiator 38, that is to say a reference pulse followed by a pulse whose timing is varied according to the modulation impressed upon the channel pulse being scanned. The reference pulse triggers AT to conduction on the left hand side and the succeeding derived channel pulse transfers conduction to the other side which is the rest condition of AT. A connection from the grid GT of the left hand side of AT is taken to a pair of grids of a double triode ET which is normally "cut-off" on these grids but is "opened" while GT is positive and the left side of AT is conducting. This controls a counting operation which counts the time between the reference pulse and derived channel pulse, which is hereinafter referred to as the "modulation interval."

The counting operation consists of counting the number of complete cycles of an oscillator DT which occur in the modulation interval, by means of a five stage binary counter consisting of the double triode valves C1, C2, C3, C4, and C5 each connected as an Eccles-Jordan circuit. The oscillator DT operates at a frequency such that 32 complete cycles occur during the longest time between the reference pulse and the derived channel pulse delayed to the extent of peak signal amplitude at 100% modulation. This period may be of the order of 8 microseconds (see graph (j), Fig. 2) and so DT must operate at a frequency of about 4 megacycles. The output of DT is applied via point FT through push-pull coupling valve ET to the input of the first binary counter stage C1. As previously explained, ET is only active during the positive periods of the grid GT of AT. With 100% modulation any number of cycles of DT between 0 and 32 can be passed to point FT during a modulation interval, according to the speech potential at a specified moment. For instance if C4 has changed over to its second condition of equilibrium for the first time, the number of cycles of DT which have been transmitted is eight. There is thus a particular combination of positions of final equilibrium for the various counter stages corresponding to any number of cycles transmitted between zero and 32. It will be seen therefore that the counting process assesses the amplitude of the modulating waveform in predetermined steps. The "off" condition of the counter tubes is with the left hand side conducting, which is also the rest condition of the tubes and the "on" condition is with the right hand side conducting.

The output gate consists of five pentodes P1, P2, P3, P4 and P5 each of which has a connection to its suppression grid from the right hand grid of one of the valves C1, C2, C3, C4 and C5 and these suppressors are normally biassed so as to cut off anode current through the gate valves, but are changed so as to permit anode current when the corresponding counter tube is in the number 2 or "on" condition. The screen grids of the pentodes are connected to the terminal marked (*k*) to which the output gate opening pulses, as shown in graph (K) of Fig. 2, are applied. These screen grids are normally "cut-off" and are only "opened" during the output gate opening pulses. Each of the pentodes has its control grid connected to a separate terminal and each of these terminals is connected to one of busbars 43 to 47. These control grids are normally "cut-off" and are only "opened" during a pulse in the corresponding one of busbars 43 to 47.

It is thus seen that each of the pentodes P1 to P5 will only pass anode current when three conditions are fulfilled namely—the output gate pulse must be present; a pulse from the corresponding one of busbars 43 to 47 must be present; the associated counter stage must be in the "on" condition.

Each pentode has the primary winding of a transformer in its anode circuit and the secondary windings of these transformers are connected in series and to terminals (*ac*) to which a pulse is applied when anode current flows in one of the pentodes.

The net result is therefore that a five unit code is passed from terminals (*ac*) to busbar 36 (Fig. 1) to which they are connected, the overall timing being determined by the output gate opening pulse applied to (K), the timing of the individual code units being determined by the timing of the pulses in busbars 43 to 47 and the presence or absence of a pulse at each of the code unit time positions being determined by the state of the five counting stages as a result of the count of cycles of DT during the modulation interval.

To reset the counter stages of the coder in preparation for scanning the next alternate channel time-modulated pulse a restoring pulse as shown in graph (*q*) of Fig. 2 is applied to the terminal marked (*q*) whence it passes through decoupling condensers and resistances marked T to the right hand grids of the five counter stages.

The restoring pulse is a negative pulse and restores conduction to the left hand side of each counter tube. This condition is the same as in the original conditions of the whole circuit, which consequently is ready to scan another modulation interval.

Figure 4:
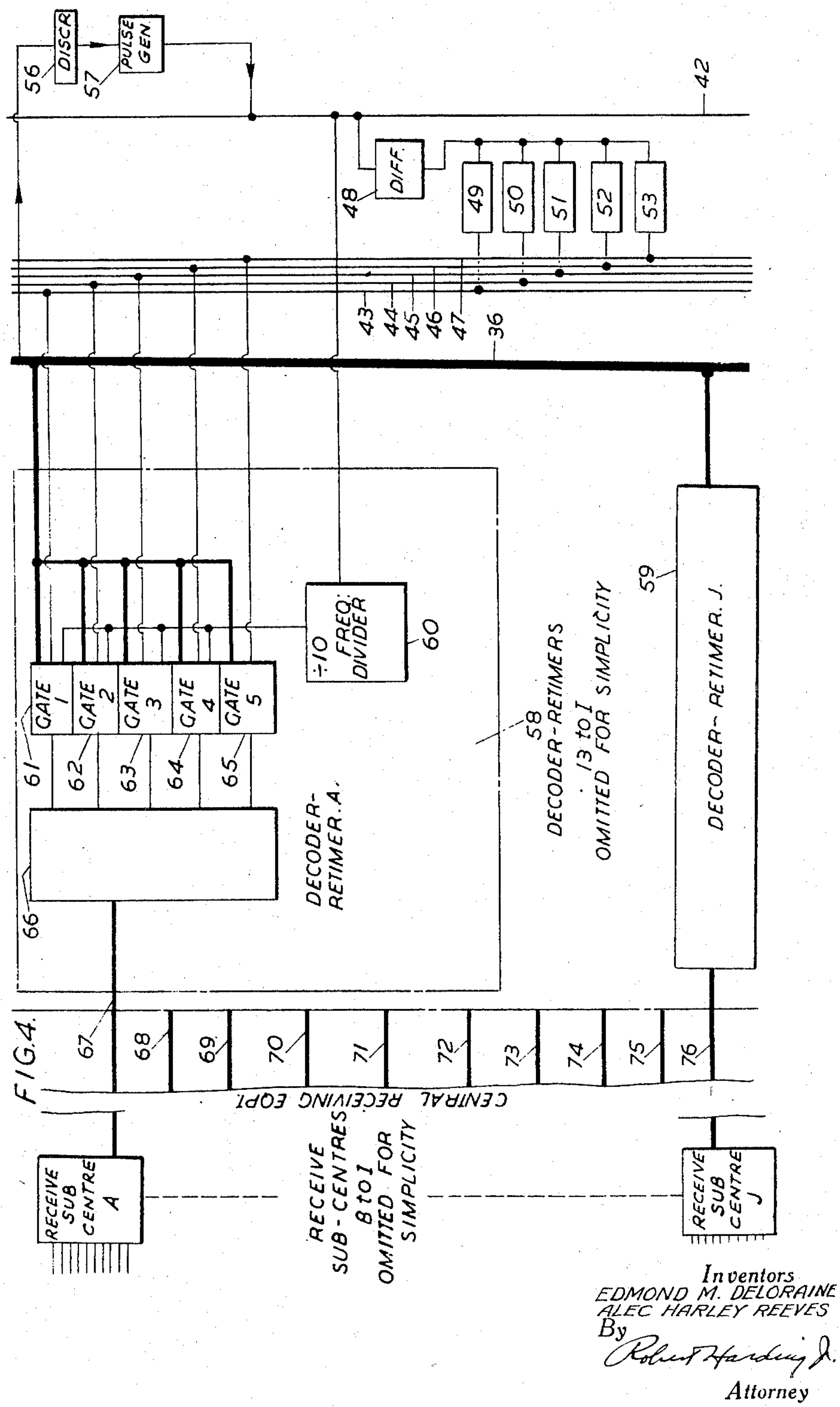
Fig. 4 is a schematic diagram of the receiving portions of the said embodiment.

The transmission path to which busbar 36 of Fig. 1 is connected, leads to the receiving end shown in Fig. 4, where there is central receiving equipment.

This comprises busbars similar to those at the central transmitting equipment, which for ease of comparison are given the same reference numerals.

The busbars 42 and 43 to 47 must be synchronised in frequency and phase with the pulses received over the transmission path connected to busbar 36 in Fig. 4.

There are many ways of doing this, one being to reserve a certain time out of the time cycle for the transmission of a synchronising pulse of different amplitude or width from the code pulses. A channel might have to be devoted to this or else the time cycle could be divided into such periods for the channels as to leave a time at the end of a cycle less than the time required for a complete channel.

This pulse would be passed through a discriminator 56 to pick out the pulse from others in busbars 36, to the pulse generator, responsible for producing the pulses in bus bar 42 and would synchronise this oscillator. All other timings at the receiver being derived from or synchronised with bus bar 42, they would thus keep step with the incoming code pulses in bus bar 36 (Fig. 4). In a practical telephone exchange system the central receiving and the central transmitting equipment will be parts of one exchange so that corresponding busbars of the two can be supplied from a common source. The receiving equipment busbar supplies must be in synchronism, however, with the pulses received over the common transmission path and must be delayed as compared with the transmission equipment busbar supplies, by a degree equal to the delay time of the common transmission path. There is thus a good reason for synchronising the receiving equipment bus bars with those of the transmission equipment by synchronising signals conveyed by the common transmission path in a manner such as that above described.

The incoming code pulses must be divided up into channel groups each of five code time positions and each channel group passed to a decoder retimer. A decoder retimer 58 is shown for group A in complete schematic form. The decoder retimer for group J is shown in skeleton and marked 59, and the other decoder retimers for groups B to I are omitted to simplify the drawing.

The process of selecting the code pulses of a group consists of taking every tenth group of code pulses in the complete cycle so that the basic pulse code group repetition frequency (in bus bar 36) which is the same as the frequency of the pulses in bus bar 42, needs to be divided by ten by a frequency divider 60 similar to frequency divider 28 in Fig. 1. Each decoder retimer has a frequency divider and all are displaced in phase by one complete channel time period of the cycle of bus bar 36. (This period is one micro-second in the example quoted.)

A pulse derived from the frequency divider 60, and called the "receive gate opening pulse," is used to open five gates 61 to 65 at the timings of the channels of the group in question.

The five gates also have connections to individual ones of busbars 43 to 47 and are barred except when a pulse is present in the associated busbar. In addition the code pulses from the busbar 36 are applied in common to the five gates which are still barred in the absence of a code pulse from busbar 36 during the coincidence of a receive gate opening pulse and a pulse from the associated busbar 43 to 47.

Each of the five gates is connected so as to set a stage of a five stage binary counter in a decoder 66. This takes the time occupied by the five code pulses of a channel, in busbar 36 (i. e. one microsecond in the example quoted).

It is the task of a decoder retimer to restore the channels of its group to pulse time modulation and to distribute them evenly within the cycle period of the individual group (100 microseconds in the example quoted of ten channels at a cycle recurrence frequency of 10 kc./s., each channel having one tenth of the period, i. e. ten microseconds, allotted to it). The channel period of the group cycle is devoted, as to one tenth, to the reception of the code setting from busbar 36. The remaining 9 tenths are therefore available for assessing the code and marking it out to a pulse generator which will produce a pulse modulated in time according to the modulation information carried by the code.

As this pulse generator can be independent of the code-assessing apparatus the time taken by its pulse need not be accommodated within the remaining nine tenths of the channel period in the group cycle.

In the example quoted this nine tenths period is 9 microseconds long so that, leaving one microsecond as an additional margin of safety against inter-channel cross talk (the code reception period also forms a safety margin in the group cycle), the assessing process can be timed to take 8 microseconds, i. e. $\frac{4}{5}$ of the channel period in the group cycle.

The assessment of the code is achieved by a five stage binary counter similar to a coder in Fig. 1, which is set to a certain condition by the five gates and then almost immediately pulsed till it reaches its rest condition. Thus with 32 possible conditions, the number of impulses required to drive it to the all-"off" condition is the complement to 32 of the number represented by the code. A gate circuit is opened at the beginning of the count and closed at its end, and on closing triggers the said pulse generator to deliver a pulse of fixed duration to the group transmission path (67 to 76 of Fig. 4 are the ten transmission paths for the ten groups). The group transmission paths lead to ten receiving sub-centres two of which namely those of groups A and J are shown in the left of Fig. 4. Each subcentre has physical connections to the receiving apparatus of the substations of the group.

The maximum number of impulses is 32 and there is a period of 8 microseconds during which they must take place, in the example quoted. This demands an impulse rate of 4 megacycles which is the same as the frequency of oscillator DL of Fig. 3.

The gates and decoder of a decoder retimer may be substantially of a type described in the said U. S. Patent No. 2,272,070 and shown in Fig. 5 of the drawings accompanying that patent. The circuits as described in that patent may be simplified somewhat and to indicate a suitable form which they may take, Fig. 5 of the drawings accompanying the present specification is a reproduction of Fig. 5 accompanying the said patent with the simplification made. For ease of comparison with that patent the same reference characters have been used in Fig. 5 as were used in Fig. 5 of the quoted patent.

Figure 5:
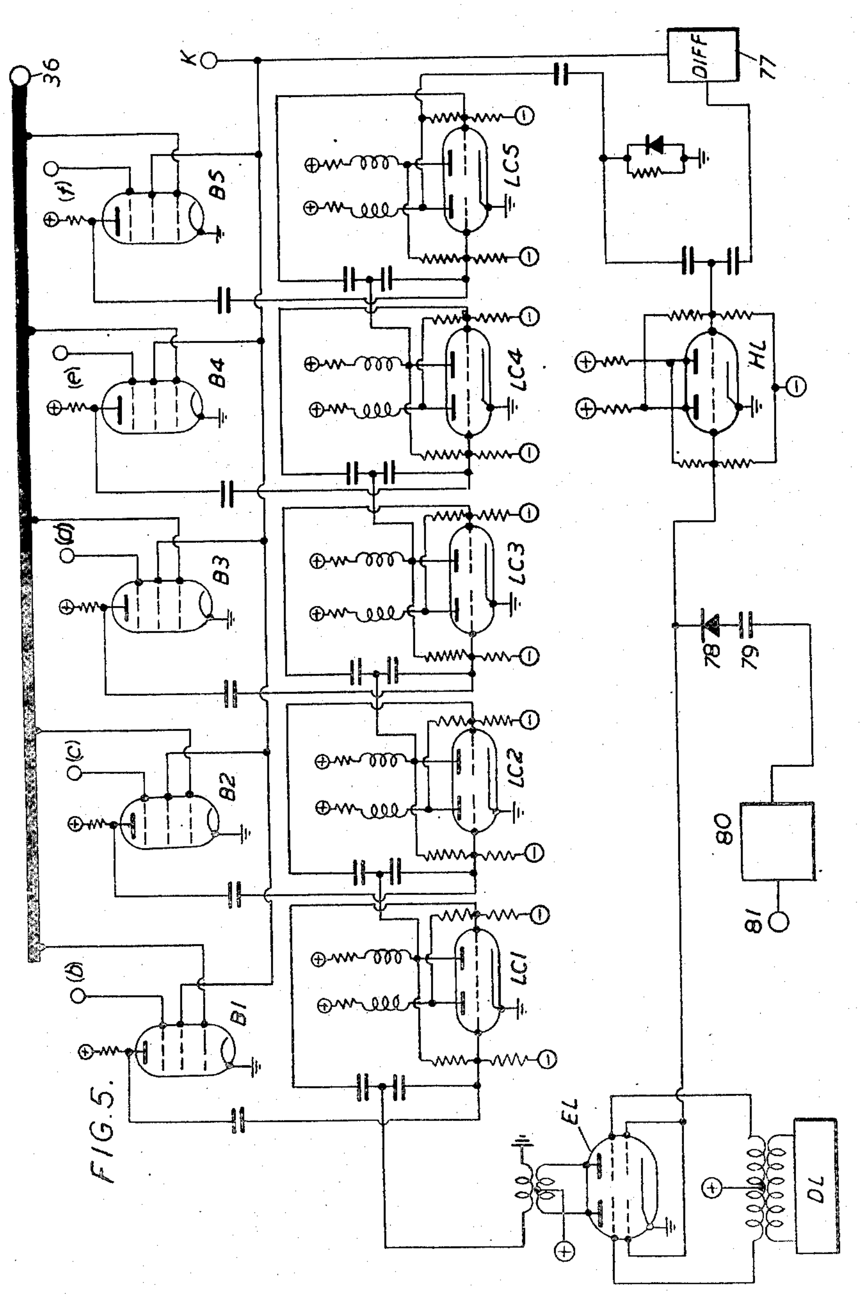
Fig. 5 is a circuit diagram of a part of the equipment shown schematically in Fig. 4.

In Fig. 5 there are five double triodes LC1 to LC5 connected as Eccles-Jordan circuits and functioning as a five stage binary counter as in Fig. 3. In this case however the condition of rest is with the right hand side of the double triodes conducting.

Five pentodes B1 to B5 are the five gates 61 to 65 of a decoder retimer and their suppressor grids are connected to terminals (*b*), (*c*), (*d*), (*e*) and (*f*) each leading to one of busbars 43 to 47 (Fig. 4). Their screen grids are connected in common to a terminal (K) to which are applied the receive gate opening pulses. Their control grids are connected to a terminal marked 36 signifying that it is connected to busbar 36 of Fig. 4.

All these grids are normally biassed so that each will "cut-off" the anode current of the valve irrespective of the condition of the other.

When a channel of the appropriate group has its code pulses present in busbar 36, the pentodes will be "opened" together on their screen grids and in turn "opened" on their suppressor grids in step with the five pulse time position of the code, by the pulses of busbars 43 to 47 (Fig. 4) and opened or closed on their control grids according to the presence or absence of a code pulse at the time when each is opened on its suppressor grid. Only a tube opened on all three grids will pass anode current and in doing so will pass a pulse from its anode to one of the tubes LC1 to LC5 with which it is associated.

The pulses from the anodes of B1 to B5 are applied the the left hand grids of LC1 to LC5 respectively and a pulse present will change over the stage concerned, into the "on" condition.

At the end of the receive gate opening pulse the differentiator connected to terminal K, passes a peaked pulse to the right hand grid of a double triode HL connected as an Eccles-Jordan circuit with its right hand side normally conducting.

The right hand side of HL is "cut-off" by the negative pulse and a positive pulse is passed from the left hand grid, to the lower grids of a double triode EL which is connected up as a push pull amplifier of oscillations produced by oscillator DL. EL is normally "cut-off" by its lower grids and on receipt of the positive potential from the left hand grid of HL it becomes conducting and passes on the oscillations of DL to the first stage LC1, of the binary counter LC1 to LC5.

The binary counter, starting from the position to which it is set by B1 to B5 completes its cycle up to the point where all the stages are restored to the off position. The number of impulses taken to do this is the complement to 32 of the number represented by the setting of the counter by B1 to B5.

The final act in the cycle is the restoration of LC5 to the "off" condition which passes a pulse to the right hand grid to HL to restore conduction to the right hand side, rendering the anode less positive. This cuts off EL and stops the counter. The left hand grid of HL is also connected through a rectifier 78 and a negative pulse is passed to pulse generator 80 which is triggered thereby and produces a pulse of fixed duration which may be two microseconds in the example quoted. This pulse is modulated in time in relation to the pulse from differentiator 77 which is of fixed timing, by the time taken to count the binary counter back to the "all off" condition.

To understand the operation of the counter the better it is useful to consider the basic operation of a five stage binary counter.

If impulses are applied to the first stage, they pass down the stages in the following manner.

every other impulse being the first stage back into the "off" condition and it is the act moving into the "off" condition by one stage which changes the condition of the succeeding stage. Every alternate impulse therefore changes over the second stage which moves back into the "off" position every fourth impulse.

Every fourth impulse changes over the third stage which therefore moves back into the "off" condition every eighth impulse.

Every eighth impulse changes over the fourth stage which therefore changes back into the "off" condition every sixteenth impulse.

Every sixteenth impulse changes over the fifth stage which therefore changes back into the "off" condition every thirty-second impulse.

Whatever the initial condition of the stages, the application of 32 impulses brings them back into the same condition.

Starting with all stages "off," 32 impulses will bring the small back into the "off" condition. During this cycle the fifth stage will change over to the "on" condition at the sixteenth impulse and back to the "off" condition at the thirty second impulse, that is to say, one change over to "on" and back to "off" in the complete cycle.

If the stages are set artificially (that is to say other than by application of impulses to the first) to conditions representing a certain number, that is to say into the conditions they would have assumed if that number of impulses had been applied when all stages were initially at "off," that number can be ascertained by applying impulses to the first stage and continuing till all are restored to the "off" condition. This state is attained at the same time as the fifth stage moves into the "off" condition. Any setting less than sixteen would find the last stage at "off" the sixteenth condition sees it move to "on" and the 32nd sees it move back to "off." Any setting more than sixteen sees it already at "on" and the 32nd condition sees it move back to "off."

The move back to "off" by the 5th stage can therefore be used as an indication that all stages are restored to "off" by using this change over to trigger a circuit cutting off the impulses in the same manner as other stages cause the change to their neighbours when they change over from "on" to "off."

When a counter is set artificially to a certain condition and then impulsed back to the all "off" condition, the number of impulses required is the complement to 32 of the number represented by the artificial setting. In some applications this complement has to be re-inverted to give a direct indication of the number represented by the artificial setting, but where the setting represents a modulation the complement can give the required answer without re-inversion, the result being simply to change the phase of the modulation through 180°. If this was of any moment in any part of a circuit it could be dealt with by changing over two conductor connections.

Figure 6:
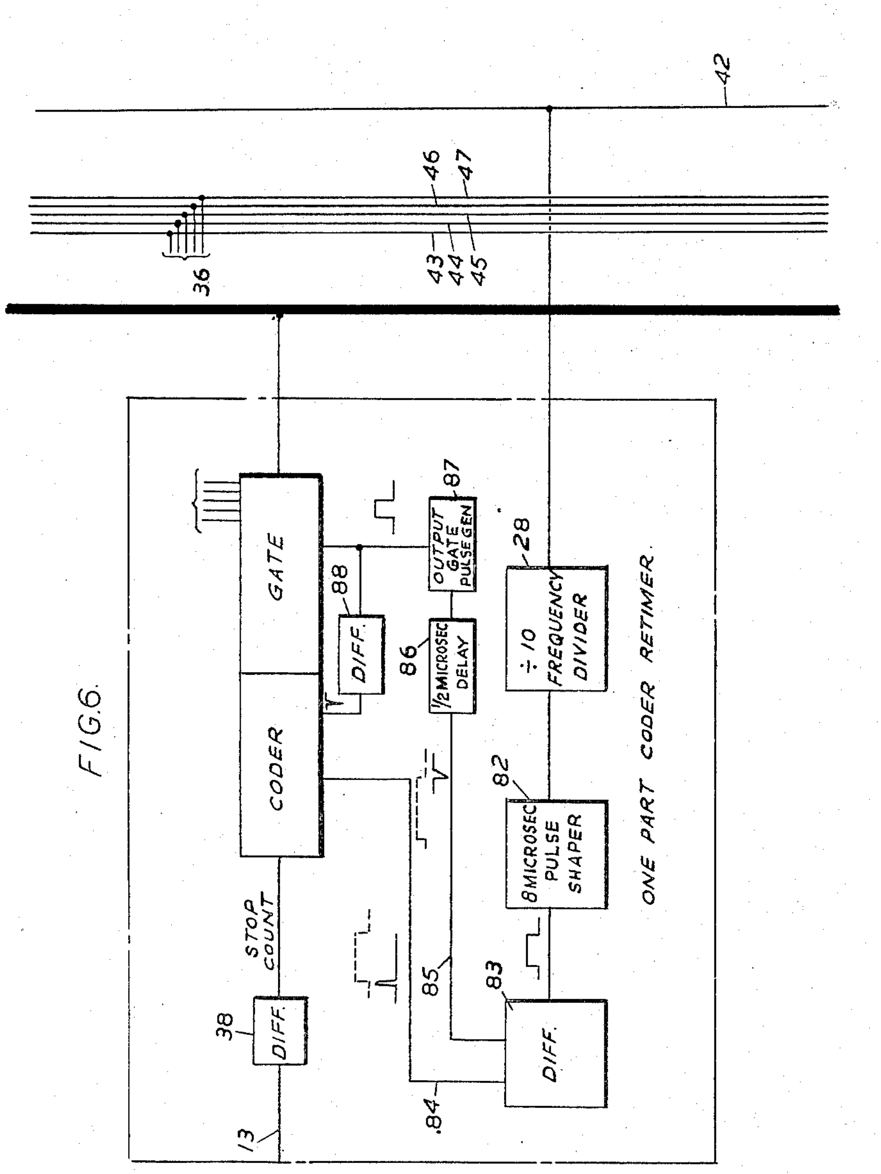
Fig. 6 is a schematic diagram showing an alternative form of a part of the equipment shown schematically in Fig. 1.

In a modification of the described embodiment the coder-retimers of Fig. 1 are simplified so as to have only one part and to take the form shown in Fig. 6, the same numerals being used as in Fig. 1 to denote corresponding items.

The operation of this one part coder-retimer is best appreciated by taking the frequencies of the example above quoted.

The time, in the transmission path from a subcentre to the central transmitting equipment, allotted for the accommodation of a channel, is ten microseconds, during which the modulation of the channel pulse must be assessed and encoded and the coder cleared down in readiness for the next channel.

Of this ten microsecond period, 8 to 9 microseconds can be devoted to the modulated pulse having 2 to 1 microseconds respectively for the transmission of the five unit code and the clearing down of the coder and output pulse gates.

It would be preferable to take the shorter period of 8 microseconds for the modulated pulse, which means that its trailing edge varies in the course of modulation within limits of 6 microseconds, where a pulse width of two microseconds is used for a channel pulse in the group transmission path. This leaves an interval of two microseconds as the minimum interpulse interval between channels which is a desirable factor of safety against interchannel cross talk.

During this two microsecond interval the one microsecond output gate opening pulse must take place, and it may be timed to take place in the middle of the two microsecond interval, leaving ½ a microsecond for the stopping of the counter and the opening of the gates, and ½ a microsecond after transmission of the five unit code, for the clear down of the counter and the gates prior to the next channel, which commences with a reference pulse.

The frequency divider 28 of the one part coder-retimer may deliver a trigger pulse at the beginning of each channel time period of the group cycle. This trigger pulse may be used to trigger a pulse shaper 82 comprising a self-restoring flip-flop circuit with a restoring period of 8 microseconds (where this is the period chosen for the accommodation of the modulated channel pulse). The output of the flip-flop circuit is differentiated by differentiator 83 to give a positive peak at the beginning and a negative peak at the end of the 8 microseconds recovery period of the flip-flop. The two peaks are separated by rectifiers and passed along separate conductors 84, 85 respectively.

The positive peak is passed to terminals BT in the counter to act as the reference pulse which starts the count and the channel pulse passes through differentiator 38 where its differentiated trailing edge also passes to terminals BY to stop the count.

The negative peak in conductor 85 is passed through a ½ microsecond delay circuit 86 to an output gate opening pulse generator 87 which delivers a pulse to the output gate to open it for transmission of the code. The same pulse is passed through differentiator 88 which produces a peak at the trailing edge of the pulse which acts as the restore pulse passed to the coder (being applied to the terminal marked "(*g*)" in Fig. 3).

There is thus no need for an input gate, since all channels pass in turn to the coder and not every other channel as in the arrangement of Fig. 1.

Figure 7:
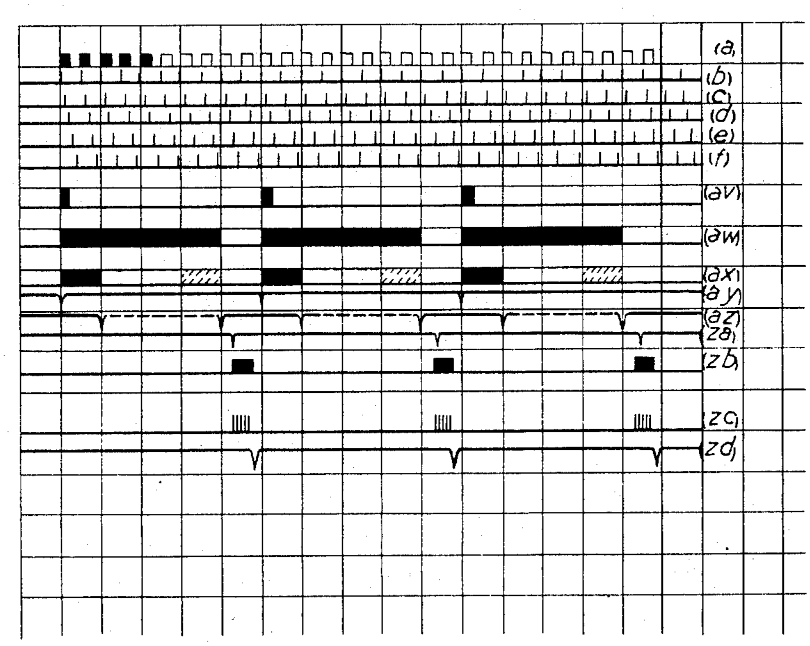
Fig. 7 is a series of graphs showing waveforms occurring at various parts of the equipment shown in Fig. 4.

The waveforms at various parts of the Fig. 6 arrangement are shown in the graphs of Fig. 7, graphs (*a*), (*b*), (*c*), (*d*), (*e*), (*f*), of Fig. 2 being re-drawn to show the time scale.

Graph (*av*) shows the trigger pulse from frequency divider 28.

Graph (*aw*) shows the 8 microsecond pulse from pulse shaper 82.

Graph (*ax*) shows the modulated channel pulse.

Graph (*ay*) shows the positive peak from differentiator 83, which starts the count.

Graph (*az*) shows the differentiated trailing edge of the channel pulse from differentiator 38.

Graph (*za*) shows the delayed negative peak from ½ microsecond delay circuits 86, which triggers output gate opening pulse generator 87, to provide the output gate opening pulse shown in graph (*zb*).

Graph (*zc*) shows the timings of the five code elements transmitted to busbar 36 and graph (*zd*) shows the restore pulse applied by differentiator 83 to the terminal marked "(*g*)" on Fig. 3.

An important aspect of pulse code modulation A, deserves mention.

When constant amplitude steps are used for the assessment of the instantaneous value of the signal, signals of low level, such as quiet speech, have fewer effective steps representing the difference between peaks and troughs of the signal waveform than is the case with high level signals such as loud speech.

As the amount of distortion introduced by the assessment of amplitude in steps is increased when few steps are used and reduced when more steps are used, it follows that low level signals will be considerably distorted. It has been found necessary to overcome this by grading the size of the steps so that smaller steps are used in the low amplitude range and larger steps in the high amplitude range.

The effect of this is to exaggerate the periodic amplitude changes at low levels of signal as compared with those at high levels of signal. If this were to be translated back into sounds without reconversion, the result would be raise the level of low level signals and lower the level of high level signals, that is to say to reduce the dynamic range of the signal sounds or in other words to produce volume compression, which is sometimes called "companding."

The same effect may be produced, and in a simpler manner by applying companding to the signals directly before or in the process of translating them to pulse time modulation at the subcentres rather than to modify the amplitude steps at the encoding stage.

In the embodiment described, companders (not shown) would preferably be inserted somewherein the channel physical circuits 1 to 10 in Fig. 1. Alternatively, using the distributor described in relation to Fig. 3 of the drawings accompanying the said co-pending application Ser. No. 777,818, filed October 3, 1947, a suitable shaping of the said saw tooth wave form could be used to give a companding effect in the process of connecting audio to pulse time modulation.

To restore the dynamic range at the receiving end, complementary expanding circuits with characteristics the inverse of the compander characteristics would be inserted somewhere in the physical circuits between the receiving subcentres and the respective channel receiving equipment.

The embodiment described above illustrates one combination of modulation methods. There are other possible combinations however as previously indicated.

It is possible, for instance to use pulse code modulation B in place of pulse code modulation A at and between the central transmitting and receiving equipments with pulse time modulation between the substations and the central transmitting and receiving equipments respectively.

With this scheme it becomes necessary to have one coder per channel since the amplitude sample taken at one "appearance" of a channel must be stored till the next "appearance" of the same channel in the group cycle, or in the alternative form of pulse code modulation B described above, the coded output of a channel must be continuously available for integration and comparison with the incoming channel intelligence. Frequency dividers, one per channel, could be used at the termination of each group transmission path to segregate the pulses of the channels and pass them to the coders.

The coders proposed in the said co-pending applications No. 778,662 and No. 778,663, filed October 8, 1947, require an input in the form of continuous audio frequency, which in the first embodiments, in that application is differentiated continuously and applied to two valve circuits which respond to negative and positive changes respectively in synchronism with a local master pulse input at a frequency equal to the chosen sampling speed. The same effect can be obtained by the differentiation of an amplitude modulated pulse input which can be derived readily from the time modulated channel pulses, by known means.

The second embodiment compares a continuous audio frequency input with the integrated output of the coder and an audio input is essential for this pulse.

The interleaving of channels in the transmission path fed by busbar 36 may be achieved by the appropriate phase displacement of the pulse output of the coder by feeding all coders from a common master pulse source and timing their outputs with individual delay circuits.

At the central receiving equipment, the pulses from busbar 36 are again distributed to individual channel decoders which restore the original signal intelligence by integration and low pass filtering of the channel code pulses or else, instead of producing an audio frequency output, a periodic amplitude modulated pulse can be obtained direct by omission of the low pass filter and this may be converted by known means to pulse time modulation which by suitable phasing of the outputs from the various decoders may be combined on the group multiplex cycle.

Alternatively the distributor described in the said co-pending application Ser. No. 778,818, filed October 3, 1947, and shown in Fig. 3 of the drawings accompanying that application could be used to distribute the channels of a group on to the group multiplex time cycle and in this case the low pass filters could be left in situ and the audio frequency outputs converted into pulse time modulated pulses, distributed as required, and applied to the transmission path serving the group receiving subcentre.

Yet another alternative combination of modulation methods is to combine pulse amplitude or width modulation in the transmission paths between the sending and receiving subcentres and the central transmitting and receiving equipments respectively, with pulse code modulation A or B at and between the central transmitting and receiving equipments.

Yet another alternative is to assess the amplitudes of the channel signals on entry to a subcentre in relation to fixed amplitude steps and transmit them in the group multiplex cycle in the form of time, width or ampltiude modulated pulses which will have fixed steps of modulation, for encoding at the central transmitting equipment the converse procedure being followed at the receiving end.

A device for assessing the amplitude in steps is described in the said U. S. Patent 2,272,070 and shown in Fig. 1 of the drawings accompanying that patent and this device could be used at the subcentre end of the channels for the purpose, the result being used to modulate the group multiplex pulses.

This scheme would have the advantage of noise and cross talk suppression inherent in the step type of intelligence modulation relation, for the benefit of the group transmission paths and though the coder shown in Fig. 3 of the drawings accompanying this specification does not need to be fed with a step modulated input, it is equally well able to operate from such an input as from a linear modulation input. The advantage of the coding is then added to that of step modulation for the avoidance of interference in the busbar 36.

The converse process would be adopted at the receiving end. Indeed this is done in any event in the embodiment described since the outgoing modulation derived from the decoders is in step form and need not be converted to continuous intelligence till it reaches the channel receiving equipment.

Yet another alternative combination of modulation methods concerns the use of different systems of fixed levels of the step modulation process of pulse code modulation A or of fixed minima of rising or falling signal amplitude between sucsive sampling instants, of pulse code modulation B in its first form for different purposes and/or in different parts of a system. This would be advantageous where different classes of intelligence are catered for in the system. For instance, in the case of intelligence for purely signalling purposes a higher degree of inherent distortion could be tolerated than for speech intelligence and in a system such as that of the embodiment described a channel or channels may be wholly devoted to this class of intelligence and, where the assessment of fixed levels or fixed level differences (of pulse code modulation A or B respectively) is carried out at subcentres, the levels could be assessed on a coarser scale of steps or a larger minimum level different respectively. In the former case the number of code elements required to represent the coarser steps is reduced and less channel space is required on busbar 36 which may be utilised to carry two signalling channels in the time taken by a single speech channel.

Yet another alternative combination of modulation methods is the use of pulse code modulation (B) with one rate of sampling in one part of the system and another rate of sampling in another part of the system.

In complex modulation systems there are two aspects of the problem which can be distinguished. On the one hand there is the manner of pulse variation which is used to indicate varying states of the intelligence to be conveyed. For instance, in pulse time modulation, the phase or timing of a pulse is varied in relation to a mean or reference timing, and in pulse amplitude modulation, the amplitude of the pulse is varied. In pulse code modulation A, however, a series of pulses is treated as a coding unit, and, in the simplest form the individual pulses are transmitted or suppressed in accordance with a code, whilst in pulse code modulation B a single pulse of uniform amplitude is suppressed and/or changed in polarity. The code modulation systems are distinguished from the other forms of modulation previously instanced above in that only a limited range of different conditions is catered for whilst in those other forms of modulation an infinite gradation of conditions between the extreme limits of modulation, is attempted, even though the attempt may in practice be frustrated by imperfections in the equipment and the transmission medium.

The manner of pulse variation viewed from this aspect is hereinafter referred to as the "way of modulation."

On the other hand, the other aspect of the problem concerns the relationship between variation of the intelligence to be conveyed and the modulation intended to represent it. Here again the modulation may attempt to follow with infinite accuracy the variations of the intelligence waveform or the degree of accuracy may be deliberately curtailed.

For instance, with pulse time, pulse amplitude, or pulse width modulation directly by audio frequency intelligence the modulation of the pulse is usually made to follow as nearly as possible, the instantaneous amplitude of the intelligence waveform at the instants of sampling or observing this waveform throughout an infinite range of values between maximum and minimum.

With the step modulation process of pulse code modulation A, a deliberate inaccuracy is introduced by defining the instantaneous amplitude of the intelligence to the nearest of the fixed levels (or the next level above, or the next level below the intelligence amplitude).

In pulse code modulation B, in its first form another type of deliberate inaccuracy is introduced by ignoring changes in intelligence waveform amplitude between one sampling instant and another, where such changes are less that of a fixed minimum and where the changes exceed the fixed minimum by recognising merely the fact that they do exceed such minimum without regard to the degree of the excess, whilst in the second form of pulse code modulation B the modulation is only able to define the rate of change of signal amplitude by means of a fixed rate of change of a discontinuous nature (i. e. in steps of uniform "rise" and "tread") a slow rate of change of signal amplitude being represented by a change in the fixed rate in one direction, periodically corrected by changes at the fixed rate in the other direction, and a rapid rate of rise being represented by a change at the fixed rate continued for longer than the persistence of the rapid rate of change of the signal amplitude.

The relationship between the variations of the intelligence to be conveyed and the modulation of pulses, viewed from this aspect is hereinafter referred to as the "intelligence-modulation relation."

It should of course be noted that any translation of a continuous intelligence waveform to a series of discrete modulated pulses constitutes a deliberate departure from complete accuracy of representation of the intelligence waveform but as this factor is common to all forms of pulse transmission with which the invention is concerned it is not intended to be embraced by the term "intelligence-modulation relation."

To enlarge upon the distinction between the way of modulation and the intelligence-modulation relation some aspects of pulse code modulation A may be considered.

The intelligence modulation relation inherent in pulse code modulation A may vary in degree according to the number of fixed levels chosen and according to the spacing of those levels on the amplitude scale. This spacing may be graded so that instead of the steps being equal, they are smaller in some ranges of amplitude than in other ranges.

The use of the stepped method of assessing the amplitude of the intelligence waveform has advantages of its own independent of those accruing from the use of a coded way of modulation. Amongst these advantages is the elimination of noise the amplitude of which is less than half the step interval and it may well be of advantage to reap these benefits by themselves in some parts of a system where the complication of a coded way of modulation is undesirable.

Again the way of modulation of pulse code modulation A can be varied both in the form of the code and the method of its transmission.

The number of units in a code combination can be varied from the number of 5 used in the embodiment described, a lesser number enabling less precise intelligence to be accommodated in a smaller frequency band-width and a larger number enabling greater precision in conveyance of the intelligence at the expense of occupying a wide frequency band.

In the embodiment described, the pulses of the five unit code are transmitted successively on a single transmission path but they could be transmitted simultaneously on individual transmission paths, with minor modifications to the equipment described.

In the central transmitting equipment the busbars 43 to 47 would be omitted and five busbars connected to five transmission paths would be substituted for busbar 36. Each section of a coder-retimer output gate would deliver its output to one of these five new busbars and would be permitted to do so during an output gate pulse which could be of one fifth the duration of the pulse described. In the central receiving equipment the same busbar modifications would be made and each of the five busbars replacing busbar 36 would be connected to one of the decoder-retimer gates and all would be opened simultaneously by a pulse from the frequency divider 60. A pulse on one of the five new busbars could be used for synchronising the central transmitting and receiving equipments.

The code pulses in the embodiment described are five in number and each can have two alternative conditions, namely pulse present and pulse absent. If three alternative conditions were available such as the alternative positive pulse, negative pulse, no pulse, as used with pulse code modulation B, twenty-seven combinations could be obtained with three code elements and 81 combinations with four code elements.

The use of all these variations of pulse code modulation A is within the scope of the invention.

The description of the invention in respect of the use of group channels concentrated onto a common transmission path at a high channel repetition frequency, and the combination in one system of different types of modulation has been framed so as to focus attention upon the transmission problems of a telephone exchange system using pulse technique and to omit reference to selection and interconnection problems with which the invention is not immediately concerned.

In a practical telephone system the arrangements of Figs. 1 and 4 would be amalgamated, each transmitting sub-centre having a companion receiving sub-centre and each incoming physical channel from a substation to the transmitting sub-centre having a companion outgoing physical channel from the associated receiving subcentre to the substation.

The central transmitting and receiving equipments are located together within an exchange, with their busbars 36 directly interconnected. The connection of a calling substation to a called substation would preferably be effected by transferring modulation intelligence from one channel (that of the caller) in each common busbar 36 to another channel (that of the callee), in response to designation signals from the calling substation. The answering signals of the callee could be similarly transferred from his channel to that of the caller or both ways of communication could be carried by either the caller's or the callee's channel.

The other combinations of modulation methods mentioned above would lend themselves to a variety of methods of selecting connections, for instance, when pulse code modulation B was used in central parts of the system the separate channels would be separated out from the group multiplex cycles to individual coding circuits whose timing of code delivery could be directly controlled by signals present in the channel modulation.

Telephone exchange systems of this general type are described in co-pending applications, Ser. No. 628,613 filed November 14, 1945, and Ser. No. 27,296 filed May 15, 1948.

While the principles of the invention have been described above in connection with specific examples and particular modifications thereof, it is to be clearly understood that this description is made only by way of example and not as a limitation on the scope of the invention.

What is claimed is:

1. In a telephone exchange system wherein communication channels take the form of time positions in a recurring cycle of time positions, the combination comprising a plurality of link circuits each having a recurring time position cycle, another link circuit having a recurring time position cycle, the time positions of which are shorter in duration and have a greater number than those of said plurality of links, and means for retiming and combining the time position of said plurality of links to concentrate them in a single cycle of the time positions of said other link.

2. In a telephone exchange system wherein communication channels take the form of time positions in a recurring cycle of time positions and intelligence is conveyed on such channels by electric pulses having at least one characteristic modulated in conformity with the said intelligence, the combination comprising a plurality of individual link circuits, each having a recurring cycle of time positions, the way of modulation of said pulses and the intelligence-modulation relation being different as between different links of said system, and means for transferring intelligence from one link to another and for converting the pulses from the way of modulation and the intelligence-modulation relation of said one link to the way of modulation and the intelligence-modulation relation of said other link, that way of modulation and intelligence-modulation relation being used in each link of the system which is best adapted to the transmission conditions of that link.

3. In a telephone system, the combination, as defined in claim 2, in which one of the links is more prone to cross-talks than the others, said link having a way of modulation and an intelligence-modulation relation which gives better performance with respect to avoidance of cross-talk than that of other ways of modulation and intelligence-modulation relations used in other links.

4. In a telephone exchange system, the combination, as defined in claim 2, in which links between subscribers and an exchange have different systems of modulation than links operating within the exchange.

5. In a telephone system, the combination, as defined in claim 2, in which at least one of the different ways of modulation and intelligence-modulation relation is pulse code modulation A and the use of such modulation is confined to links which accommodate a larger number of time positions in a given time period than do other links of the system.

6. In a telephone exchange system, the combination, as defined in claim 2, in which at least one of the different ways of modulation and intelligence-modulation relation is pulse code modulation B and the use of such modulation is confined to links which accommodate a larger number of time positions in a given time period than do other links.

7. In a telephone system, the combination, as claimed in claim 2, in which in at least one link of the system the intelligence-modulation relation is of the type where the instantaneous amplitude of the intelligence waveform is defined relative to a scale of predetermined fixed levels of amplitude, and the way of modulation of pulses is in the form of a variation of the timing, amplitude or duration of the pulses, and in which in another link of the system the way of modulation is of the type where, of two or more time intervals, each is either occupied by the transmission of a pulse or not so occupied, according to a code of combinations and permutations, each representing one of the levels of a scale of fixed levels as aforesaid.

8. In a telephone exchange system, the combination, as claimed in claim 1 in which intelligence is conveyed by electric pulses occurring during the said time positions, such pulses being modulated in conformity with the said intelligence, and in which the way of modulation used in the other link taking the form of the said single cycle of time positions into which other cycles of time positions are concentrated, is that of pulse code modulation A.

9. In a telephone exchange system, the combination as claimed in claim 1 in which intelligence is conveyed by electric pulses occurring during the said time positions, such pulses being modulated in conformity with the said intelligence, and in which the intelligence-modulation relation used in the other link taking the form of the said single cycle of time positions into which other cycles of time positions are concentrated, is that of pulse code modulation A.

10. In a telephone exchange system, the combination, as claimed in claim 1 in which intelligence is conveyed by electric pulses occurring during the said time positions, such pulses being modulated in conformity with the said intelligence, and in which the way of modulation used in the other link taking the form of the said single cycle of time positions into which other cycles of time positions are concentrated, is that of pulse modulation B.

11. In a telephone exchange system, the combination, as claimed in claim 1 in which intelligence is conveyed by electric pulses occurring during the said time positions, such pulses being modulated in conformity with the said intelligence, and in which the intelligence-modulation relation used in the other link taking the form of the said single cycle of time positions into which other cycles of time positions are concentrated, is that of pulse code modulation B.

12. In a telephone exchange system, the combination, as claimed in claim 2 in which the intelligence-modulation relation in at least one link of the said system is of the type where the intelligence waveform is assessed at regular spaced instants and the change in amplitude between two consecutive instants measured in relation to a predetermined fixed minimum degree of change, the modulation recording three alternative conditions, namely, first an increase in amplitude which exceeds the said measuring, second, a decrease which exceeds the said minimum and third no change or a change which does not exceed the said minimum, and in other links of the said system the way of modulation is of the type where three alternatives namely, a positive pulse, a negative pulse or no pulse at all, at a certain time position in a recurring time position cycle, records three alternative states of the intelligence waveform.

13. In a telephone exchange system, the combination, as claimed in claim 2 in which intelligence-modulation relations based on scales of predetermined fixed amplitude levels are used in a plurality of different links of the system, and in which different scales of such fixed levels are used in different ones of the said plurality of links.

14. In a telephone exchange system, the combination, as claimed in claim 2 in which the intelligence-modulation relation in one or more links of the said system is of the type where the rate of change of signal amplitude is compared with a predetermined fixed rate of change of a discontinuous or stepped nature, the modulation recording two alternative conditions, the first when the amplitude of the intelligence waveform is above the amplitude of waveform conforming to the said fixed rate of change, the second when the amplitude of the intelligence waveform is below that of the said waveform conforming to the said fixed rate of change, and in other links of the said system the way of modulation is of the type where only two alternative modulation conditions of a pulse are possible.

15. In a telephone exchange system, the combination, as claimed in claim 2 in which in one or more links the way of modulation and intelligence-modulation relation is pulse code modulation A, and in one or more other links the way of modulation and intelligence-modulation relation is pulse code modulation B.

16. In a telephone exchange system, the combination, as claimed in claim 2, in which the way of modulation and the intelligence-modulation relation in a plurality of links of the system is pulse code modulation B, and in which the repetition frequency of instants at which the amplitude of intelligence is observed is different as between different ones of the said plurality of links, and in which the predetermined fixed minimum change of amplitude as between one instant and the next necessary to cause the said change to be recorded in the modulation is different as between different ones of the said plurality of links.

EDMOND MAURICE DELORAINE.
ALEC HARLEY REEVES.

REFERENCES CITED

The following references are of record in the file of this patent:

UNITED STATES PATENTS

| Number | Name | Date |
|---|---|---|
| 2,262,838 | Deloraine | Nov. 18, 1941 |
| 2,272,070 | Reeves | Feb. 3, 1942 |
| 2,395,467 | Deloraine | Feb. 26, 1946 |
| 2,429,613 | Deloraine | Oct. 28, 1947 |
| 2,438,908 | Goodall | Apr. 6, 1948 |
| 2,443,198 | Sallach | June 15, 1948 |
| 2,449,467 | Goodall | Sept. 14, 1948 |